US009486956B2

(12) United States Patent
Villarreal et al.

(10) Patent No.: US 9,486,956 B2
(45) Date of Patent: Nov. 8, 2016

(54) POWER ADAPTER COMPONENTS, HOUSING AND METHODS OF ASSEMBLY

(71) Applicant: APPLE INC., Cupertino, CA (US)

(72) Inventors: Cesar Lozano Villarreal, Santa Clara, CA (US); Alexander M. Kwan, Los Altos Hills, CA (US); Kevin A. Oberther, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 142 days.

(21) Appl. No.: 14/267,371

(22) Filed: May 1, 2014

(65) Prior Publication Data

US 2015/0093924 A1    Apr. 2, 2015

Related U.S. Application Data

(60) Provisional application No. 61/884,970, filed on Sep. 30, 2013.

(51) Int. Cl.
   *H01R 13/66*   (2006.01)
   *B29C 65/56*   (2006.01)
   *B29C 65/08*   (2006.01)
   *B29C 65/00*   (2006.01)
   (Continued)

(52) U.S. Cl.
   CPC ............ *B29C 65/565* (2013.01); *B29C 65/08* (2013.01); *B29C 65/081* (2013.01); *B29C 66/112* (2013.01); *B29C 66/114* (2013.01); *B29C 66/244* (2013.01); *B29C 66/542* (2013.01); *B29C 66/81419* (2013.01); *B29C 66/8322* (2013.01); *B29C 66/8432* (2013.01); *H01F 27/2804* (2013.01); *H01F 27/306* (2013.01); *H01R 13/5045* (2013.01); *H01R 13/655* (2013.01); *H01R 43/0207* (2013.01); *B29C 66/71* (2013.01); *B29C 66/9512* (2013.01); *B29C 66/9513* (2013.01); *B29L 2031/3481* (2013.01); *H01F 2027/2809* (2013.01); *H01F 2027/2819* (2013.01); *H01R 31/065* (2013.01); *Y10T 29/49915* (2015.01)

(58) Field of Classification Search
   CPC ............ H01R 13/719; H01R 13/6658; H01R 23/025; H01R 13/7195; H01R 23/7073; H01R 13/6616; H01F 27/027; H01F 27/292; H01F 5/04; H01F 17/0013; H01F 27/2847
   USPC ............. 439/620.05–620.07, 620.11, 620.12, 439/620.15, 620.16, 620.21–620.23, 676; 336/65, 83, 192, 200, 223
   See application file for complete search history.

(56) References Cited

U.S. PATENT DOCUMENTS 4,661,792 A * 4/1987 Watkins ................. H05K 1/145
                                                    336/192
4,873,757 A * 10/1989 Williams ............ H01F 17/0013
                                                    29/602.1

(Continued)

*Primary Examiner* — Thanh Tam Le
(74) *Attorney, Agent, or Firm* — Kilpatrick Townsend & Stockton LLP

(57) ABSTRACT

A dual-purpose transformer may be oriented in a plane perpendicular to planes in which printed circuit boards connected thereto are oriented, thereby providing structural support for a framework that can include a dense arrangement of internal power adapter components, in addition to stepping down voltage. Methods for ultrasonic welding are also provided and may be used to concurrently assemble, join and press-fit power adapter housing components. A ground lug is also provided that is shaped and located within a cover piece of a power adapter housing to allow for blind mating with a printed circuit board during an assembly process.

19 Claims, 12 Drawing Sheets

(51) Int. Cl.
*H01R 13/504* (2006.01)
*H01R 13/655* (2006.01)
*H01R 43/02* (2006.01)
*H01F 27/28* (2006.01)
*H01F 27/30* (2006.01)
*B29L 31/34* (2006.01)
*H01R 31/06* (2006.01)

(56) References Cited

U.S. PATENT DOCUMENTS

| | | | | |
|---|---|---|---|---|
| 5,687,233 A * | 11/1997 | Loudermilk | ....... | H01R 13/6658 333/185 |
| 6,642,827 B1 * | 11/2003 | McWilliams | ......... | H01F 27/324 29/602.1 |
| 6,786,772 B1 * | 9/2004 | Liu | ....................... | H01R 24/64 439/541.5 |
| 6,962,511 B2 * | 11/2005 | Gutierrez | ........... | H01R 13/7172 439/490 |
| 7,241,181 B2 * | 7/2007 | Machado | ............. | H01R 13/514 439/541.5 |
| 7,314,387 B1 * | 1/2008 | Liu | ................... | H01R 13/6633 439/620.11 |
| 7,656,261 B2 * | 2/2010 | Teng | ...................... | H01F 27/29 336/192 |
| 7,701,316 B2 * | 4/2010 | Teng | ..................... | H01F 27/292 336/131 |
| 7,889,043 B2 * | 2/2011 | Hsu | ........................ | H01F 27/06 336/200 |
| 7,920,039 B2 * | 4/2011 | Shabany | ................. | H01F 27/22 336/200 |
| 7,952,457 B2 * | 5/2011 | Yamaguchi | ........... | H01F 27/306 336/196 |
| 7,982,576 B2 * | 7/2011 | Feng | ................... | H01F 27/2866 336/200 |
| 8,289,119 B2 * | 10/2012 | Lin | ..................... | H01F 27/2847 336/192 |
| 8,498,124 B1 * | 7/2013 | Folker | ................... | H05K 1/145 361/740 |
| 8,529,297 B2 * | 9/2013 | Chang | ................ | H01R 13/6658 439/620.09 |
| 8,964,410 B2 * | 2/2015 | Chang | ..................... | H05K 1/18 336/123 |
| 9,148,066 B2 * | 9/2015 | Chen | .................... | H01F 27/292 |
| 9,251,949 B2 * | 2/2016 | Wu | ..................... | H01F 27/292 |
| 9,362,044 B1 * | 6/2016 | Folker | ................... | H01F 27/292 |
| 2011/0053418 A1 * | 3/2011 | Margulis | .............. | H01R 13/719 439/620.07 |

* cited by examiner

POWER ADAPTER COMPONENTS, HOUSING AND METHODS OF ASSEMBLY

CROSS-REFERENCES TO RELATED APPLICATIONS

This application claims the benefit of prior filed U.S. Provisional Application No. 61/884,970, filed on Sep. 30, 2013, which is incorporated herein by reference in its entirety.

BACKGROUND OF THE INVENTION

The present invention relates to power adapters and methods for assembling the same. More particularly, the present invention relates to improved transformer assemblies, grounding components and assembling techniques for power adapters.

Power adapter chargers are used to charge a wide range of electronic devices. For example, devices, such as tablets, laptops, netbooks, desktops, and all-in-one computers; cell, smart, and media phones; storage devices, portable media players, navigation systems, monitors, and others can be charged using power adapter chargers. In response to the increase in the number electronic devices sold and the decreasing size of those devices, demand has increased for highly efficient assembling techniques for power adapters and increased component density within power adapters.

However, many power adapter manufacturers continue to utilize assembly techniques that rely heavily on manual assembly and power adapter components that have gone unimproved or insufficiently improved for an extended period of time. For example, transformer assemblies continue to be a limiting factor in component density and current grounding components still require manual assembly. In addition, interference fits that require substantial manual labor and result in less robust power adapters continue to be employed by many manufacturers of power adapters.

BRIEF SUMMARY OF THE INVENTION

This invention provides improved power adapter components, including a redesigned transformer, a new grounding component and power adapter assembly techniques that utilize ultrasonic welding. For example, a dual-purpose transformer may be oriented in a plane substantially perpendicular to planes in which printed circuit boards connected thereto are oriented, thereby providing structural support for a framework that includes a dense arrangement of internal power adapter components, in addition to stepping down voltage. As another example, methods for ultrasonic welding are also provided and may be used to concurrently assemble, join and press-fit power adapter housing components. Furthermore, a ground lug is provided that is shaped and located within a power adapter to allow for blind mating with a printed circuit board during an assembly process that uses ultrasonic welding or other techniques.

According to one embodiment, a power adapter is provided. The power adapter can include first and second printed circuit boards oriented in first and second planes, respectfully. The first plane can be substantially parallel to the second plane. The plug connector can also include a transformer having first and second coiled windings extending between the first and second printed circuit boards. The first and second coiled windings can be oriented in a third plane substantially perpendicular to the first and second planes. The plug connector can also include a body configured to enclose the first and second printed circuit boards and the transformer. The body can include first and second faces oriented in planes substantially parallel to the first and second planes According to another embodiment, a power adapter is provided. The power adapter can include electrical components configured to convert AC power received by the power adapter into external DC power, a housing configured to enclose the electrical components, a cover piece forming a plug region and a connection opening. The plug region and the connection opening can be configured to receive a corresponding detachable plug. The cover piece can include a ground prong for slidably engaging a notch formed in the detachable plug and a ground lug insert molded with the cover piece and operatively coupled to the ground prong. The ground lug can be electrically connected to a printed circuit board of the electrical components via a flexible member. The power adapter can also include contact pins positioned within the connector opening and operatively coupled to the electrical components.

According to yet another embodiment, the invention pertains to a method for assembling a power adapter. The method includes using a press to an L-shaped cover piece partially within a receiving area of the power adapter housing such that a first portion of the cover is deflected as a protrusion of the first portion contacts the receiving area and translates a deflecting force about an elbow of the cover piece; applying a horn to a second portion of the cover piece. The second portion can be oriented in a first plane perpendicular to a second plane in which the first portion is oriented when not deflected. The method can further include using a horn to provide ultrasonic acoustic vibration to the cover piece that causes the cover piece to be further seated within the receiving area as surfaces of the cover piece are ultrasonically welded to the receiving area, thereby positioning the protrusion within a receiving cavity of the receiving area such that the protrusion no longer translates the deflecting force.

Although aspects of the invention are described in relation to power adapters, it is appreciated that these aspects and methods can be used in a variety of different environments such as tablets, laptops, netbooks, desktops, and all-in-one computers; cell, smart, and media phones; storage devices, portable media players, navigation systems, monitors, and others.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIGS. 3A-1 and 3B-1 are cross-sectional front views corresponding to the side views shown in FIGS. 3B and 3C, respectively, according to an embodiment of the present invention;

DETAILED DESCRIPTION OF THE INVENTION

Figure 1A:
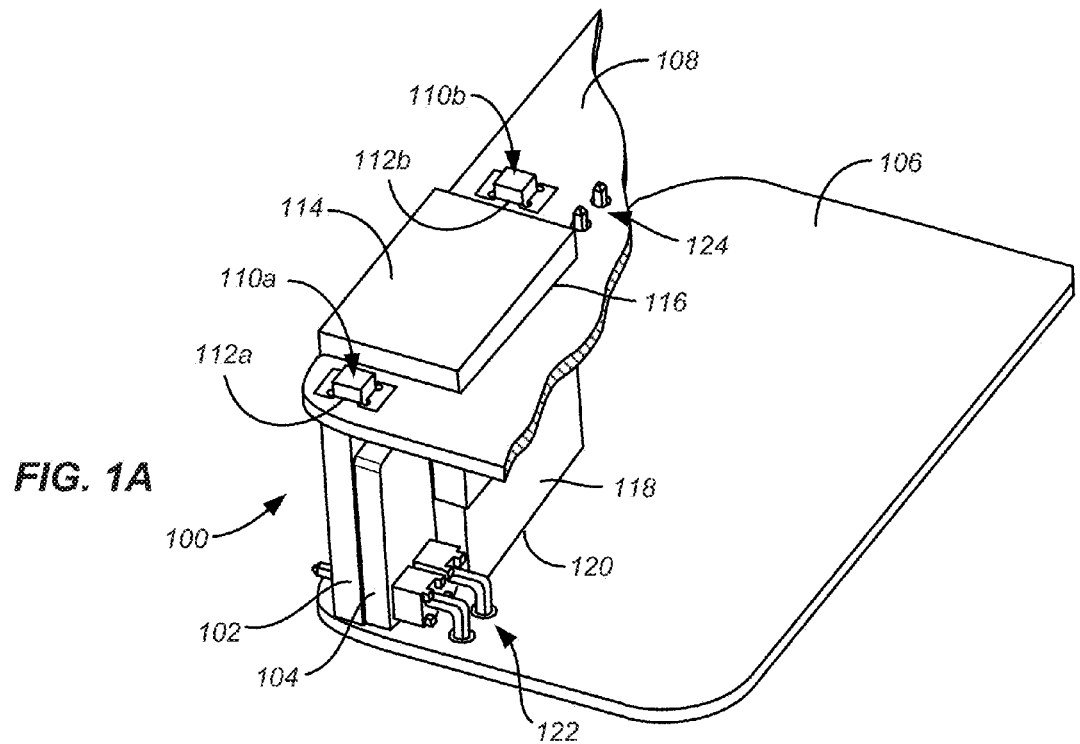
FIG. 1A illustrates a perspective view of a transformer connected with first and second printed circuit boards, according to an embodiment of the present invention.

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Embodiments of the present invention are directed to dual-purpose transformers that may be oriented in a plane perpendicular to planes in which printed circuit boards connected thereto are oriented. These transformers may provide traditional transformer functionality, e.g., stepping down voltage for use by devices. In addition, these transformers may provide structural support for printed circuit boards such that these transformers and printed circuit boards can serve as the framework for a multiplicity of components internal to a device, e.g., a power adapter. This dual-purpose—voltage regulating and structurally supporting—transformer may allow for greater component density as one component may replace the need for and function of two components.

Embodiments of the present invention are also directed to an ultrasonic welding process that may be used to assemble power adapter components. For example, an ultrasonic welding machine may bring components, e.g., power adapter housing parts, together but slightly offset from their fully assembled positions. The ultrasonic vibrations may cause the interfacing portions of the components to deform such that they are able to travel to their fully assembly position, whereas the un-deformed components would not have been able to connect in their fully assembly positions because they were sized to overlap instead of interconnect. Thus, this assembly process may modify the shape of components, albeit slightly, such that they may be assembled while welding them together. Other portions of these components may be concurrently and similarly welded together or otherwise joined, e.g., via an interference fit or simply being positioned flush against each other, as a result of the travel that occurs during the ultrasonic welding process.

Embodiments of the present invention are also directed to a ground lug. The ground lug may be coupled between a ground line of a printed circuit board and a ground plug of the power adapter. The ground lug may be shaped and located within a power adapter such that it may be blindly mated with a printed circuit board when the power adapter is fully assembly. In this manner, no placing and soldering of wires may be required to establish the coupling between the ground plug and a ground line. A flexible member, a leaf spring contact, may provide electrical coupling and positioning tolerance by flexing as necessary to adapt to and to connect with the ground lug in its final assembled position. For example, the flexible member may be biased to extend from the printed circuit board farther than necessary towards the assembled position of the ground lug. Accordingly, the ground lug may still connect with the flexible member even if it is slightly out of position, e.g., positioned farther away from the flexible member than originally expected, and the flexible member may deflect and adjust to the position of the ground lug while maintaining electrical contact therewith.

These embodiments are further discussed in the following subsections of the Detailed Description: (I) dual-purpose transformers for power adapters, and (II) ultrasonic welding processes for assembling power adapter housings, and (III) ground lugs for power adapters.

I. Dual-Purpose Transformers for Power Adapters

As mentioned above, transformers continue to be a limiting factor in component density. For example, transformers are typically oriented in planes parallel to the planes in which printed circuit boards are oriented when connected with the transformers and assembled in power adapter housings. This configuration does not create a framework for the inclusion of components in a high density manner. Rather, it is a plug-and-play style design that lacks consideration for what functions could be provided by the transformer, other than just varying and/or isolating voltage wherever implemented. In contrast, as described below, the dual-purpose transformers for power adapters of the present invention provide a structural functionality in addition to traditional functions.

Figure 1B:
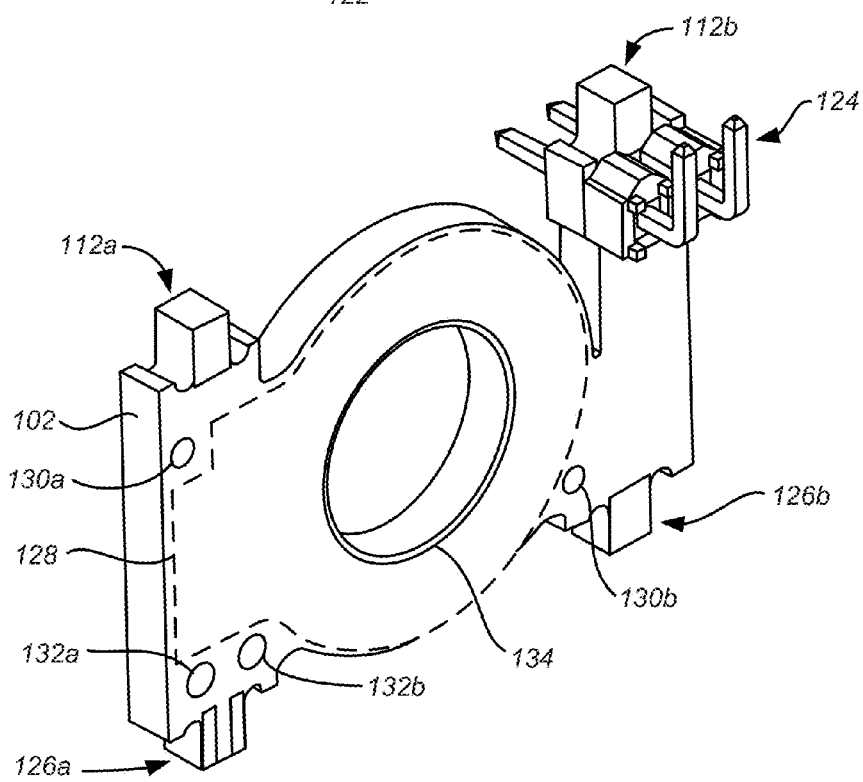
FIGS. 1B-1F are perspective views of the transformer of FIG. 1A in various stages of assembly, illustrating its various components, according to an embodiment of the present invention.

FIG. 1A illustrates a perspective view of transformer 100 connected with first and second printed circuit boards 106, 108, according to an embodiment of the present invention. Transformer 100 includes first and second coiled winding 102, 104 extending between first and second printed circuit boards 106, 108, bracing first and second printed circuit boards 106, 108 together as shown in FIG. 1A. This bracing may be accomplished by embedding tips of the coiled windings within the printed circuit boards 106, 108, which may also facilitate a board-to-board connection for first and second printed circuit boards 106, 108. For example, tips 110*a*, 110*b* of first coiled winding 102 may protrude through first and second openings 112*a*, 112*b* of second printed circuit board 108. Soldering may be used to connect tips 110*a* and 110*b* to second printed circuit board 108 at openings 112*a* and 112*b*, respectively. Additional tips (e.g., tips 126*a*, 126*b*, as shown in FIG. 1B) on first coiled winding 102 may also protrude through third and fourth openings (not shown, but see, e.g., openings 112*a*, 112*b*) of first printed circuit board 106. These tips, like tips 110*a*, 110*b*, may be soldered at the corresponding third and fourth openings of first printed circuit board 106. Accordingly, first and second coiled winding 102, 104 may be oriented in a plane extending between first and second printed circuit boards 106, 108, which plane may be perpendicular (or, e.g., within about 10 degrees of perpendicular) to planes in which the first and second printed circuit boards 106, 108 are oriented.

Transformer 100 may also include an insulation element 114 protruding through a first notch 116 in second printed circuit board 108. Similarly transformer 100 also includes and I-core 118 (as further discussed below) that protrudes through a second notch 120. Pin headers such as surface mount technology (SMT) headers may further electrically couple the coiled windings to the printed circuit boards. For example, as shown in FIG. 1A, SMT headers 122 and 124 (partially shown) further electrically couple coiled windings 102 and 104 to printed circuit boards 106 and 108, respectively. Thus, transformer 100 may be electrically and mechanically connected with first and second printed circuit boards 106, 108 to form a structural framework for the inclusion of additional electrical components. As structural members of this framework, first and second coiled winding 102, 104 may be sized and constructed to support loads exerted on first and second printed circuit boards 106, 108. For example, first and second coiled windings 102, 104 may have a thickness, extending in a direction parallel to the planes in which the first and second printed circuit boards are oriented, of 2 mm or between about 1.5 mm and 2.5 mm. First and second coiled winding 102, 104 may be made from fiberglass and copper.

Figure 6A:
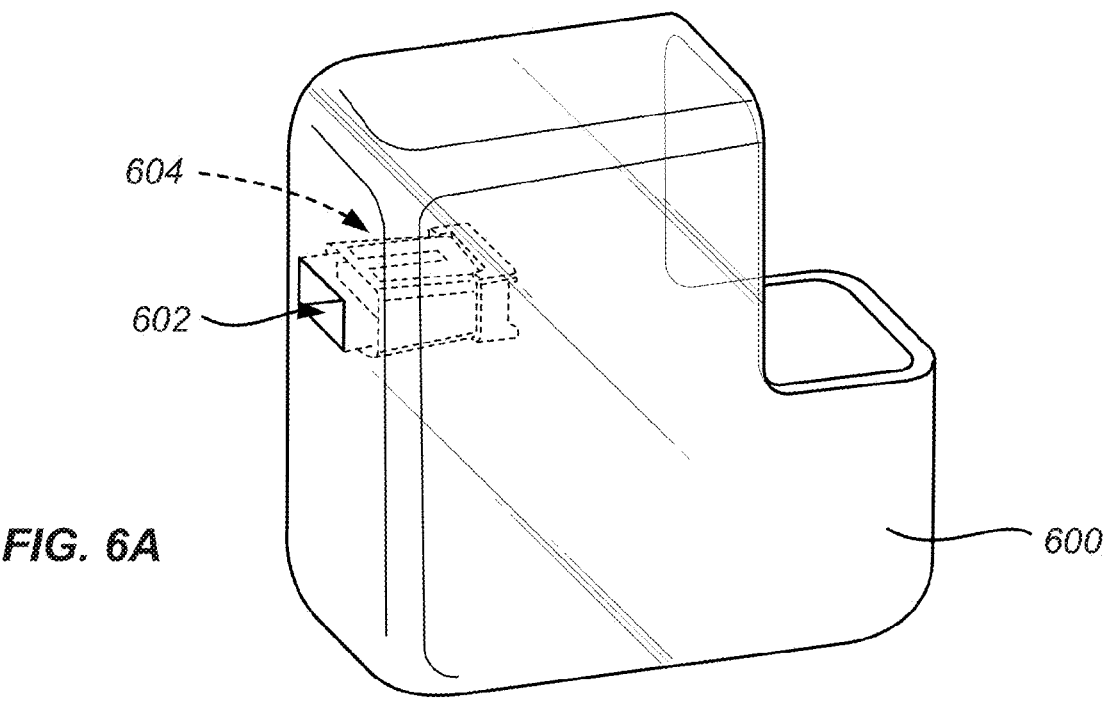
FIGS. 6A and 6B are simplified perspective and front views of a power adapter housing that is integrally formed with a receptacle connector.

This framework, wherein first and second coiled windings 102, 104 brace first and second printed circuit boards 106, 108 together as shown in FIG. 1A, may be utilized within a number of the devices listed above, and, in particular, within a power adapter body or housing (e.g., body or housing 600, as shown in FIG. 6A). For example, first and second printed circuit boards 106, 108 may be positioned within a power adapter housing such that they are adjacent to and oriented parallel (or, e.g., within about 10 degrees of parallel) to side faces of a power adapter housing, resulting in first and second coiled windings 102, 104 being positioned such that they are oriented in a plane perpendicular (or, e.g., within about 20 degrees of perpendicular) to planes in which the side faces of the power adapter housing are oriented.

Although first and second printed circuit boards 106, 108 are shown in FIG. 1A as having a specific shape and size, these boards may also be sized differently to adapt to the housing in which they are included. For example, although shown as being flat in FIG. 1A, printed circuit boards 106, 108 may have curvatures, surfaces extending in a straight direction from a substantially flat portion of the printed circuit board and/or other openings and notches. Furthermore, first and second printed circuit boards 106, 108 may each be uniquely sized and shaped, instead of having the same size and shape as shown in FIG. 1A. These variations of first and second printed circuit boards 106, 108 may still connect with transformer 100 as shown in FIG. 1A. Alternatively, pin connectors may be used for this connection. For example, pin connectors (e.g., one per coiled winding) may be used to connect first and second coiled windings 102 and 104 with first and second printed circuit boards 106 and 108, respectively.

In addition to serving as a structural support member of the above described framework, transformer 100 may also perform traditional transformer function. For example, transformer 100 may be configured to convert the AC power provided to a device, e.g., a power adapter, by the power source into power usable by the devices or, in the case of a power adapter, external power that is transferable to other devices connected to an electrical connection extending from the power adapter. More specifically, transformer 100 may convert electrical power from one voltage-current level to another voltage current level. The external power may be widely varied. For instance, transformer 100 may be adapted with different voltage ratings. In one implementation, the voltage of the external power ranges from about 8 volts to about 20 volts. Thus, one of first and second printed circuit boards 106, 108 may be the higher-voltage printed circuit board and the other may be the lower-voltage circuit board.

Figure 1C:
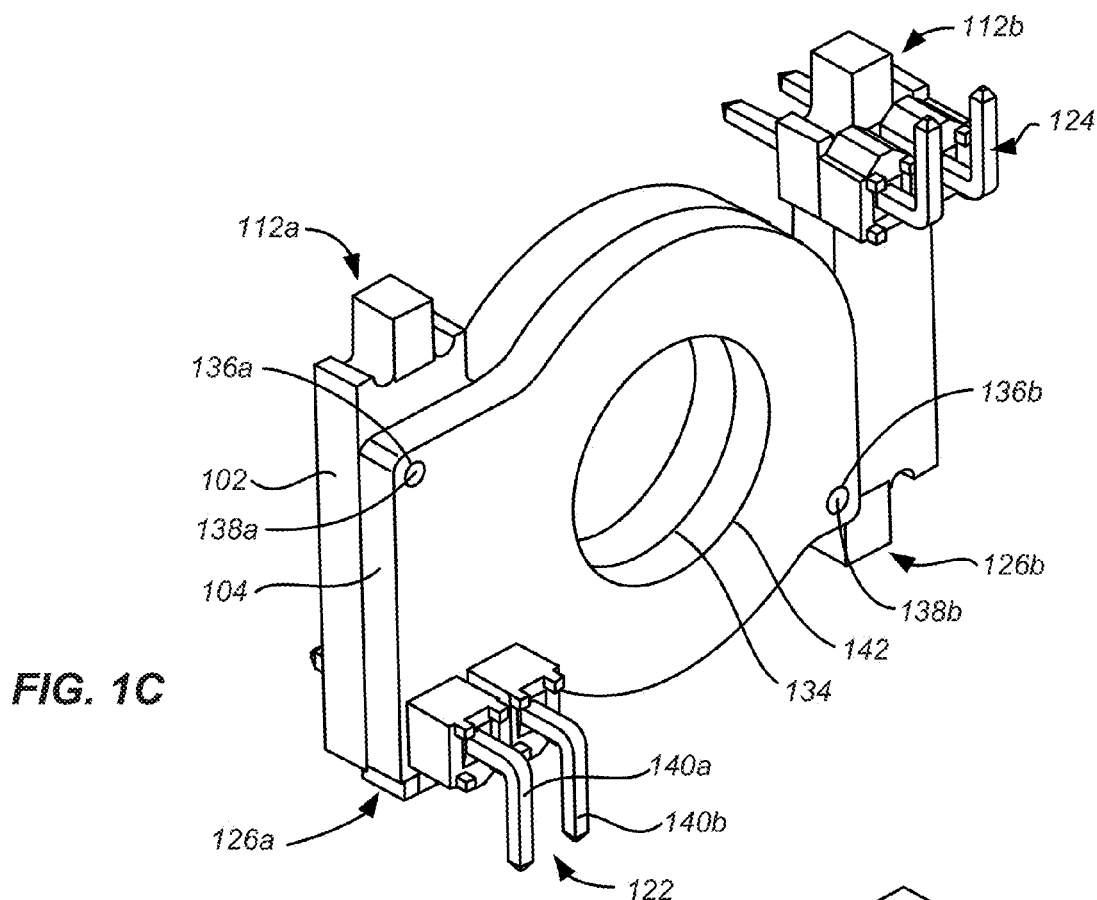
Figure 1D:
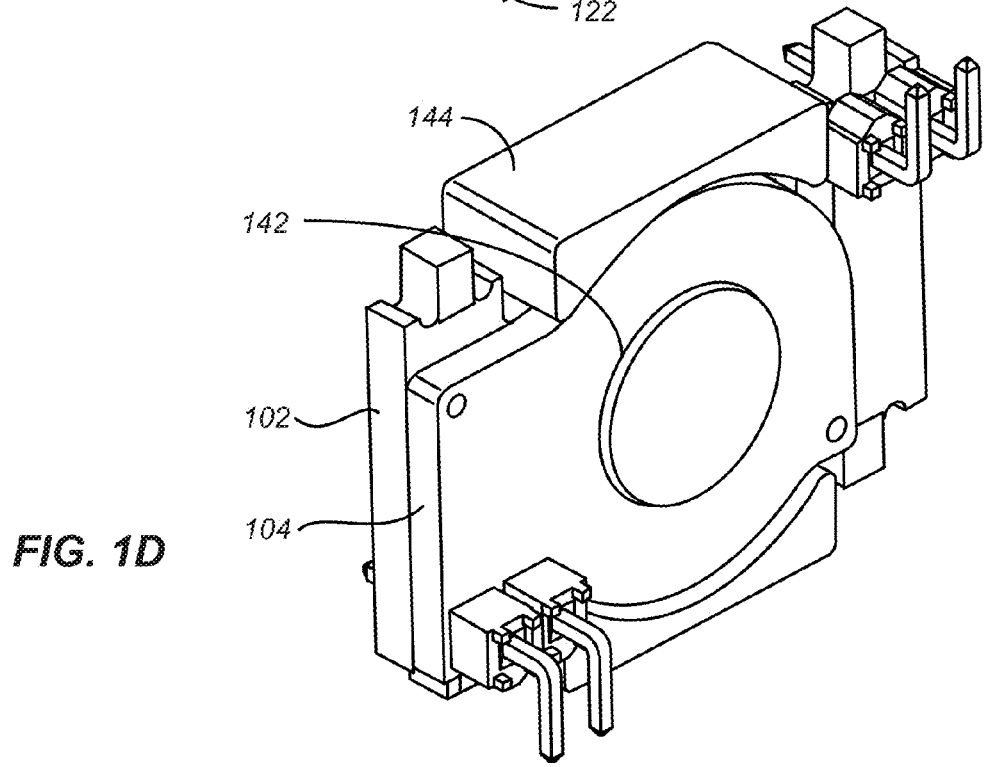

FIGS. 1B-1F are perspective views of the transformer of FIG. 1A in various stages of assembly, illustrating its various components, according to an embodiment of the present invention. FIG. 1B shows first coiled winding 102 separated from second coiled winding 104 and including tips 112*a*, 112*b* and SMT header 124. FIG. 1B also shows previously referenced additional tips 126*a*, 126, which tips may protrude through third and fourth openings (not shown, but see, e.g., openings 112*a*, 112*b*) of first printed circuit board 106 (shown in FIG. 1A). FIG. 1B also illustrates an adhering region 128 of coiled winding 102, which region may interface with second coiled winding 104 (shown in FIG. 1A) when first and second coiled windings 102, 104 are adhered together, as discussed further below. First coiled winding 102 may also include a number of openings for interconnecting with other components of transformer 100. For example, first coiled winding 102 includes openings 130*a*, 130*b* for receiving dowel pins that extend through corresponding openings of second coiled winding 104 (see openings 136*a*, 136*b*, as shown in FIG. 1C). Headers openings 132*a*, 132*b* may also be included and configured to receive pins of SMT header 122 (e.g., see pins 140*a*, 140*b*, as shown in FIG. 1C). Yet another opening, an opening 134, may also be included. Opening 134 may be configured to receive a portion of an E core (e.g., E core 144, as shown in FIG. 1D) when assembled with second coiled winding 104.

FIG. 1C shows second coiled winding 104 assembled with first coiled winding 102. As mentioned above, second coiled winding 104 may be adhered to first coiled winding 102. A number of different adhesives could be used to accomplish this, including epoxy and silicon adhesives. In addition, dowel rods may be used to secure first and second coiled windings 102 together. For example, second coiled winding 104 may include opening 136*a*, 136*b*, corresponding to openings 130*a* and 130*b*, for receiving dowel pins. Dowel pins 138*a*, 138*b* may be inserted through openings 136*a* and 130*a* and openings 138*b* and 138*b*, respectively, thereby providing additional mechanical support for securing together first and second coiled windings 102, 104. Although not their primary function, SMT headers 122, 124 may similarly provide mechanical support. For example, pins 140*a*, 140*b* of SMT headers 122 may be inserted into header openings 132*a*, 132*b* (shown in FIG. 1B). Second coiled winding 104 may also include an opening 142 that is configured to receive a portion of an E core (e.g., E core 142, as shown in FIG. 1D) when assembled with first and second coiled windings 102, 104.

Just as first and second printed circuit boards 106, 108 are shown in FIG. 1A as having a specific shape and size, first and second coiled windings 102, 104 are also shown as having specific shape and size (see FIG. 1C). However, first and second coiled windings 102, 104 may also be sized differently to adapt to the housing, e.g., a power adapter housing, in which they are included. For example, in a larger housing or a housing including a larger number of internal components, it may be necessary to provide more space between the printed circuit boards (e.g., printed circuit boards 106, 108) to accommodate the internal components. Accordingly, first and second coiled windings 102, 104 may extend a greater distance in bridging the gap between the printed circuit boards, while still being oriented in a plane extending between the printed circuit boards, which plane is substantially perpendicular to the planes in which the printed circuit boards are oriented.

Figure 1E:
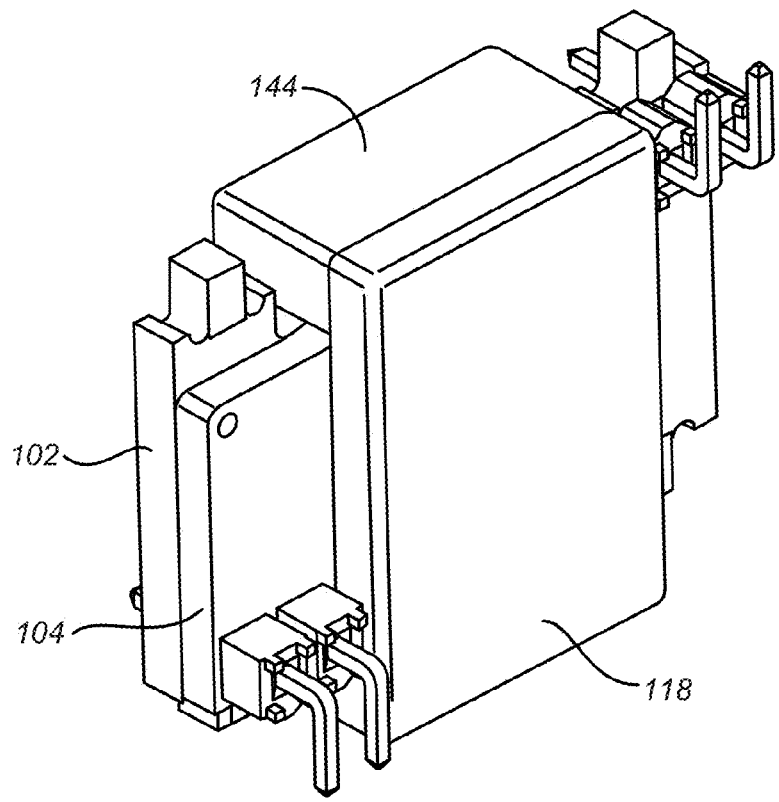
Figure 1F:
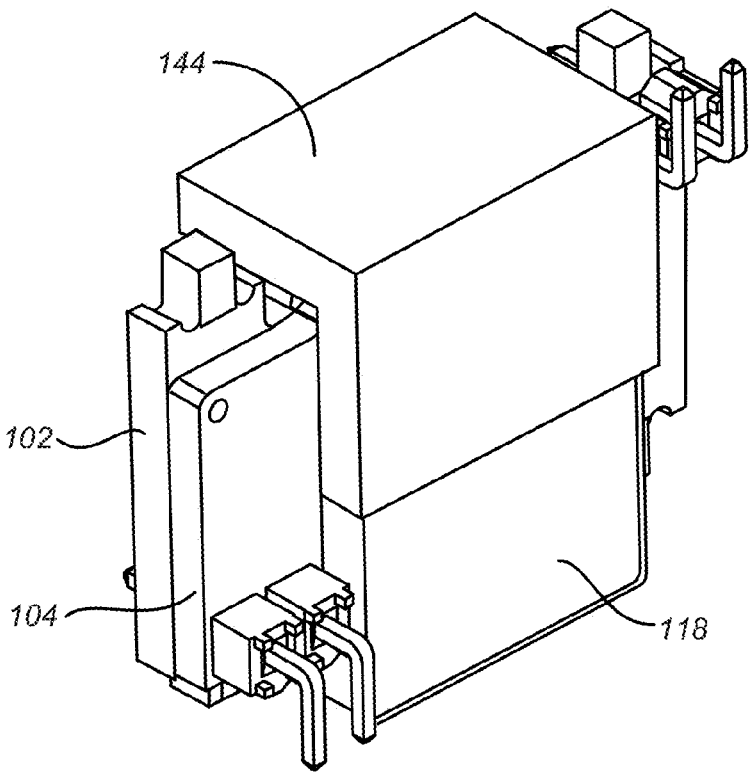

Referring to FIGS. 1D-1F, a ferrite core may be assembled with first and second coiled windings 102, 104. For example, as shown in FIG. 1D, an E-core 144 may be assembled over first and second coiled windings 102, 104, extending through opening 134 and opening 142 (shown in FIGS. 1B-1C). As previously mentioned, I-core 118 may be assembled over second coiled windings 104 and assembled with E-core 144, as shown in FIG. 1E. I-core 118 may also be epoxied to E-core 144 to hold the ferrite core together. Copper tape may be wrapped around I-core 144 about its longitudinal direction and an insulation element 114, e.g., made from polyester resin or other non-conducive materials, may also be epoxied to first and second coiled windings 102, 104, as shown in FIG. 1F. As discussed previously and shown in FIG. 1A, insulation element 114 may also protrude through first notch 116 in second printed circuit board 108a and I-core 118 may protrude through second notch 120.

Although transformer 100 has been described above as including a number specific components, additional components and substitute components may also be implemented for transformer 100. The variations may account for various environmental factors, including the types and sizes of devices in which transformer 100 is implemented. In addition, these variations may be adapted according to methods of assembly used for the device housings, e.g., a power adapter body or housing. For example, a power adapter body may be primarily integrally formed and include a small opening for receiving internal components. Examples of one such method of assembly for a power adapter body, which may be well suited for the inclusion of transformer 100, are illustrated in the following figures.

II. Ultrasonic Welding Processes for Assembling Power Adapter Housings

As mentioned above, many traditional assembling techniques for device housings such as power adapter bodies or housings rely on interference fits that require substantial manual labor during the assembly process. The housings are also formed from a large number of discrete elements. These designs result in less robust power adapters that require longer and more labor intensive assembling processes, but these processes continue to be employed by many manufacturers of power adapters.

The method of assembly of the present invention may be employed for a number of different types of devices and corresponding device housing design styles. However, for simplicity, the present invention is described with reference to one particular device housing type and style; a power adapter housing that is integrally formed except for having an inlet cover that is assembled with the integrally formed housing using methods of the present invention. An example of these methods of assembling a power adapter is illustrated in the following figures.

Figure 2:
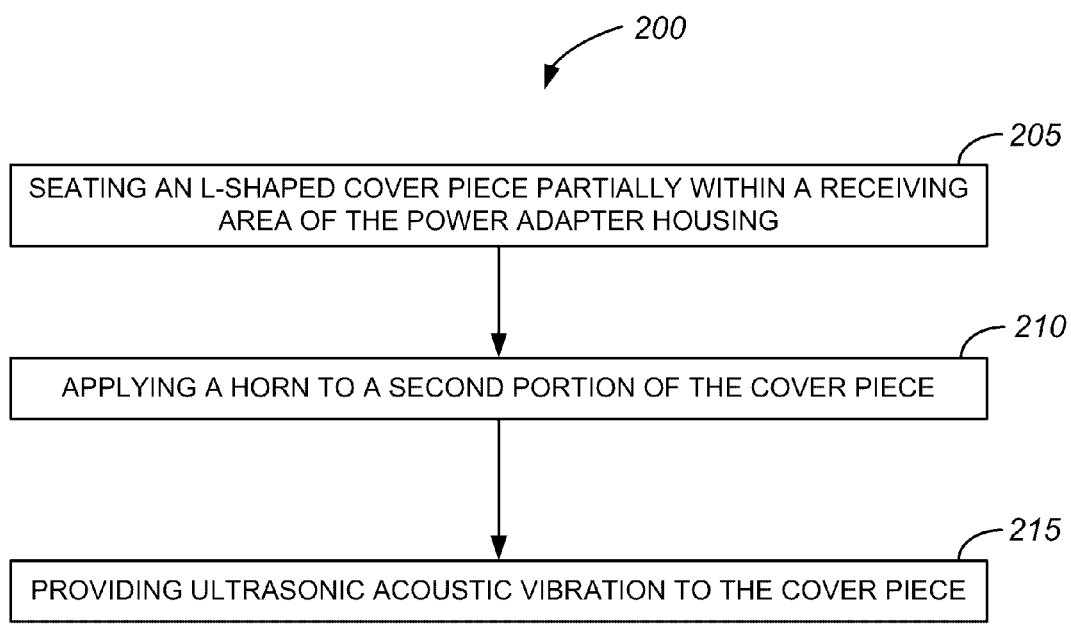
FIG. 2 illustrates a method for assembling and concurrently ultrasonically welding together components of a power adapter body, according to an embodiment of the present invention.

FIG. 2 illustrates a method 200 for assembling and concurrently ultrasonically welding together components of a power adapter body, according to an embodiment of the present invention. Method 200 may be used to assemble an inlet cover or cover piece with a power adapter housing. Each step of method 200 is described below with reference to figures that physically illustrate the respective steps.

Figure 3A:
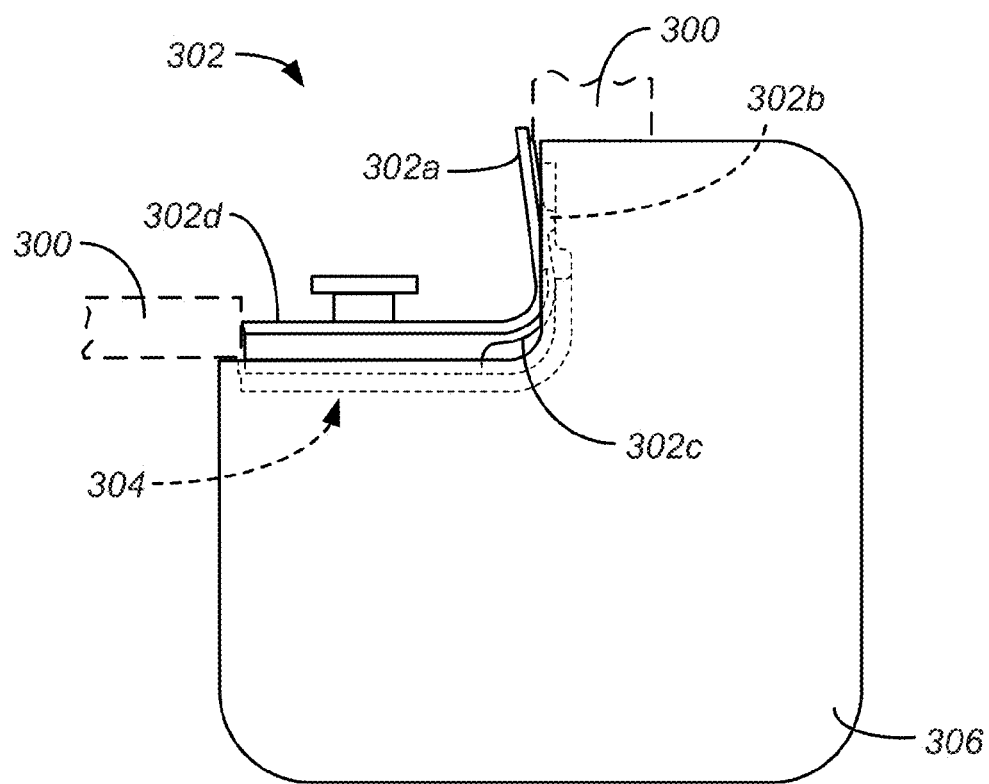
FIGS. 3A-3C are side views of a cover piece and a power adapter housing at different steps of the assembly method of FIG. 2, according to an embodiment of the present invention.
Figure 3B:
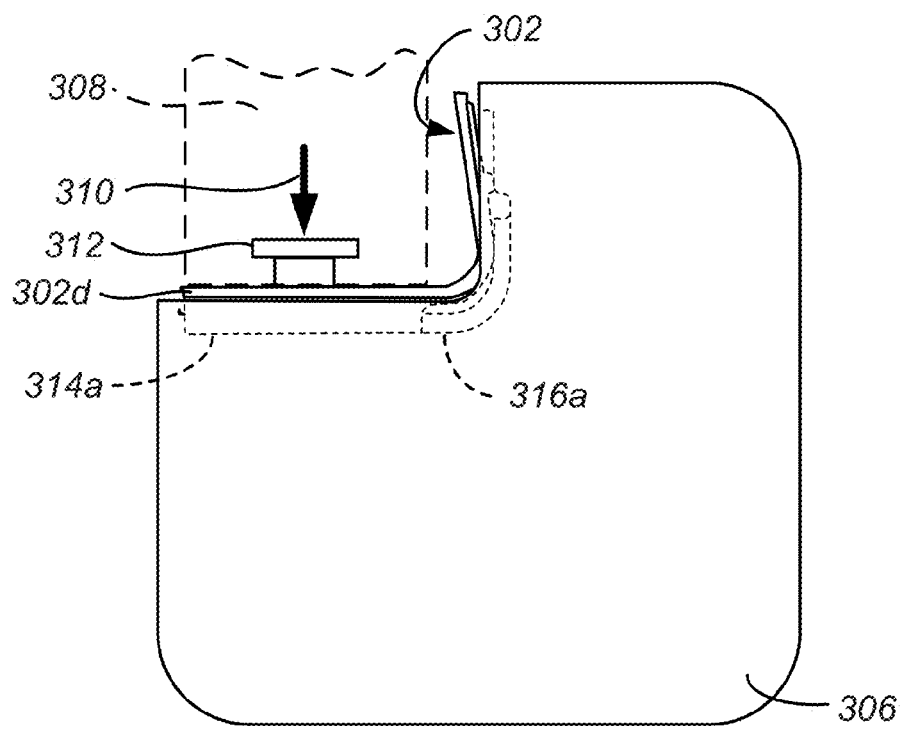
Figure 3C:
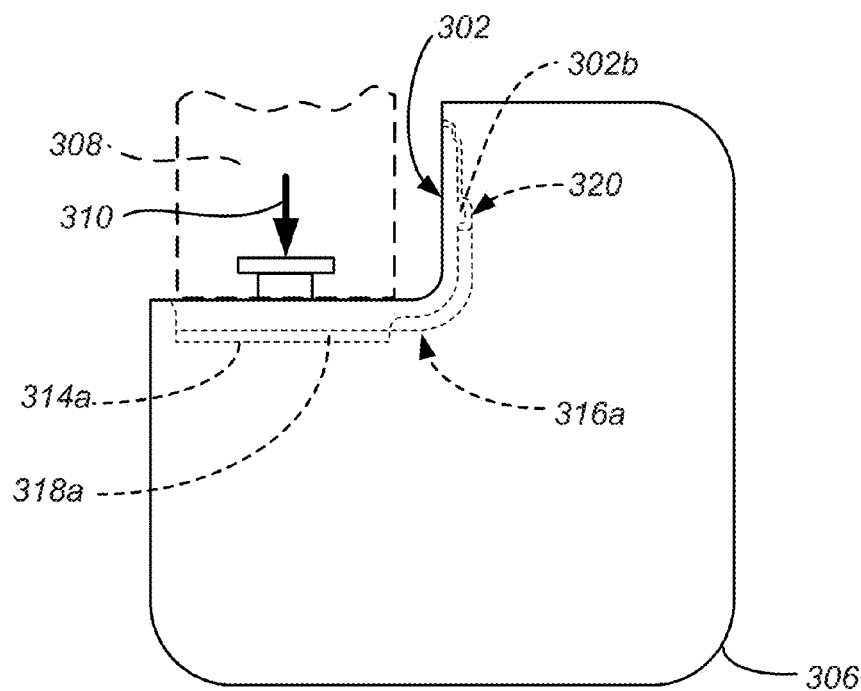
Figure 5A:
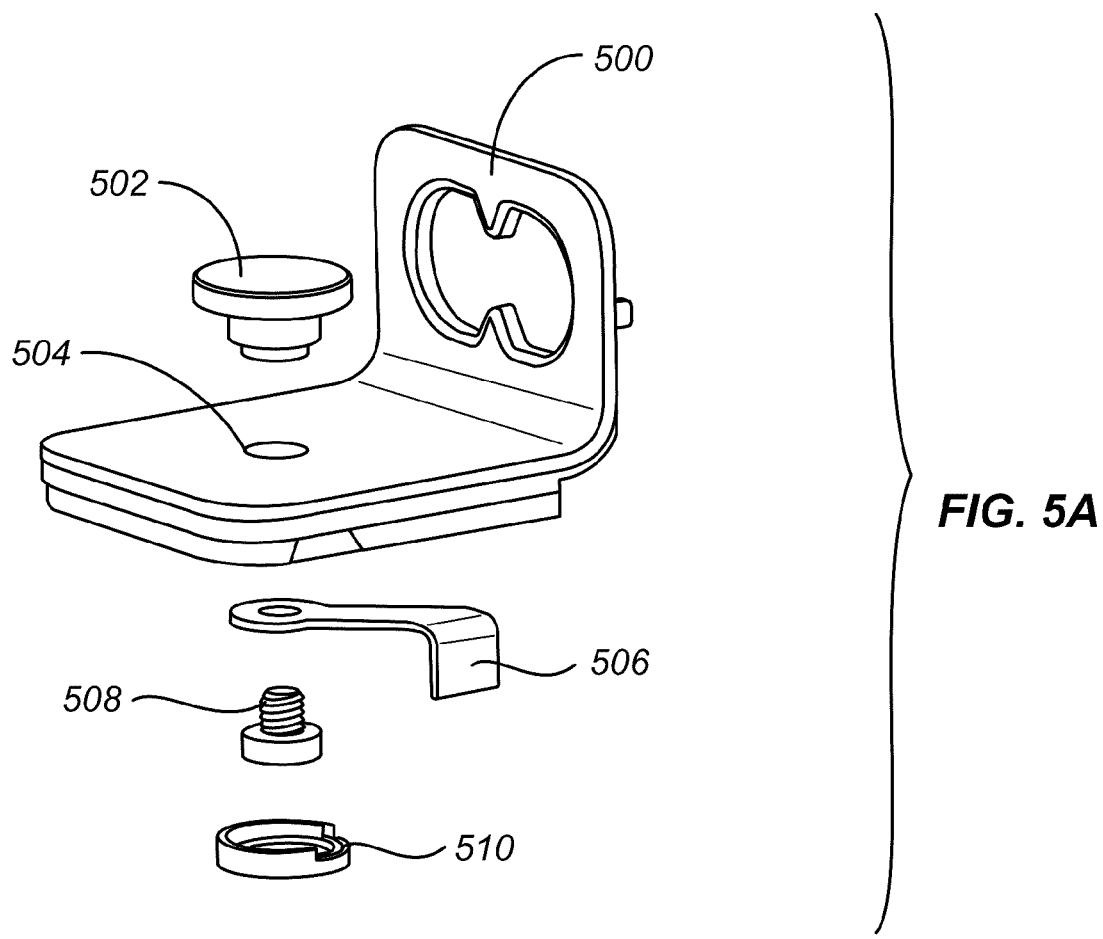
FIGS. 5A and 5B are exploded and simplified perspective views, respectively, of a cover piece for a power adapter housing that includes a grounding lug, according to an embodiment of the present invention.

At a step 205, an L-shaped cover piece may be seated or placed partially within a receiving area of a power adapter housing. FIGS. 3A-3C are side views of a cover piece and a power adapter housing at different steps of assembly method 200, according to an embodiment of the present invention. And FIGS. 3A-1 and 3B-1 are cross-sectional front views corresponding to the side views shown in FIGS. 3B and 3C, respectively, according to an embodiment of the present invention. As shown in FIG. 3A, which may correspond to step 205, a press 300 or other positioning machine has placed an L-shaped cover piece 302 (e.g., cover piece 500, as shown in FIG. 5A) partially within a receiving area 304 of a power adapter housing 306. The press may hold cover piece 302 and power adapter housing 306 under pressure such that they remain appropriately positioned throughout an ultrasonic welding process. Due to the shape of cover piece 302 and receiving area 304, the positioning of cover piece 302 causes a first portion 302a of cover piece 302 to deflect as a protrusion 302b of cover piece 302 comes into contact with receiving area 304, as shown in FIG. 3A. This deflection occurs as a force—a deflection force—is exerted by receiving area 304 on protrusion 302b, which force is translated by protrusion 302b about an elbow 302c of cover piece 302, causing first portion 302a to deflect, as shown in FIG. 3A.

After cover piece 302 and power adapter housing 306 are securely positioned as shown in FIG. 3A, method 200 may proceed to the next step. An example of the next step is shown in the following figures.

At a step 210, an anvil or horn is applied to a second portion of the cover piece. For example, as shown in FIG. 3B, a horn 308 is applied in an application direction 310 to second portion 302d. As mentioned earlier, this second portion 302d may be oriented in a place perpendicular to a plane in which first portion 302b is oriented when not deflected (e.g., see first portion 302b in FIG. 3C and cover piece 500 in FIG. 5A). Horn 308 may be an ultrasonic welding transducer that is used to apply ultrasonic acoustic vibrations to one or more workpieces, e.g., cover piece 302 and/or power adapter housing 306, during ultrasonic welding operations. Horn 308 may be shaped to conform to second portion 302d and to accommodate a ground plug 312 that may extend from second portion 302d. Following step 210, cover piece 302 may be positioned within receiving area 304. Accordingly, as shown in FIG. 3A-1, edges 314a and 314b of second portion 320d may be positioned adjacent to ledges 316a and 316b of receiving area 304, respectively.

After horn 308 is applied to second portion 302d, method 200 may proceed to the next step. An example of the next step is shown in the following figures.

At step 215, horn 308 may provide ultrasonic acoustic vibration (e.g., about application direction 310) to second portion 302d of cover piece 302 that causes cover piece 302 to be further seated within receiving area 304 as surfaces (e.g., edges 314a, 314b) of cover piece 302 are ultrasonically welded to receiving area 304 (e.g., at ledges 316b, 316a), as shown in FIG. 3C. FIG. 3 also illustrates that following the providing of ultrasonic acoustic vibration, edges 314a and 314b are pushed past the original positions of now deformed ledges 316a, 316b, thereby creating solid state welds 318a, 318b, as shown in FIG. 3B-1. In addition, first portion 302a has also traveled such that protrusion 302b is positioned within a receiving cavity 320 of receiving area 304 and no longer translates the deflecting force that previously caused first portion 302a to deflect. Accordingly, this ultrasonic welding step also press-fits first portion 302a within receiving area 304 and fully assembles cover piece 302 with power adapter housing 306.

Figure 3D:
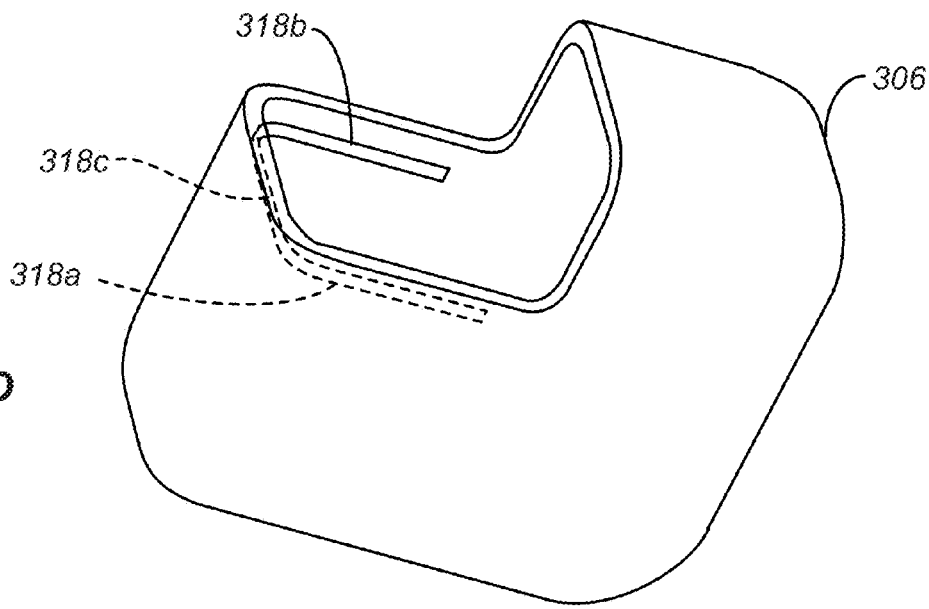
FIG. 3D illustrates a simplified perspective view of the power adapter housing of FIGS. 3A-3C at the conclusion of the method of FIG. 2, but with the cover piece removed for illustrative purposes, according to an embodiment of the present invention.
Figures 1, 3A:
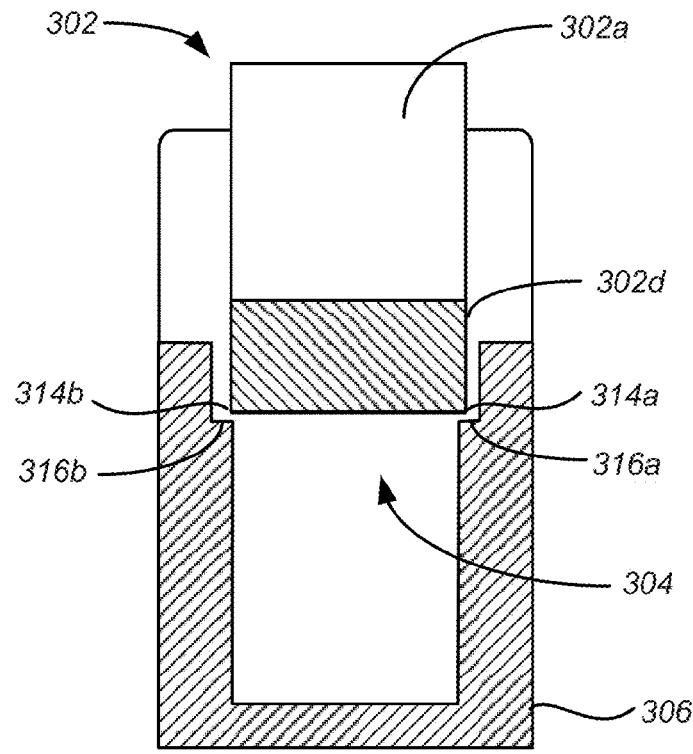
Figures 1, 3B:
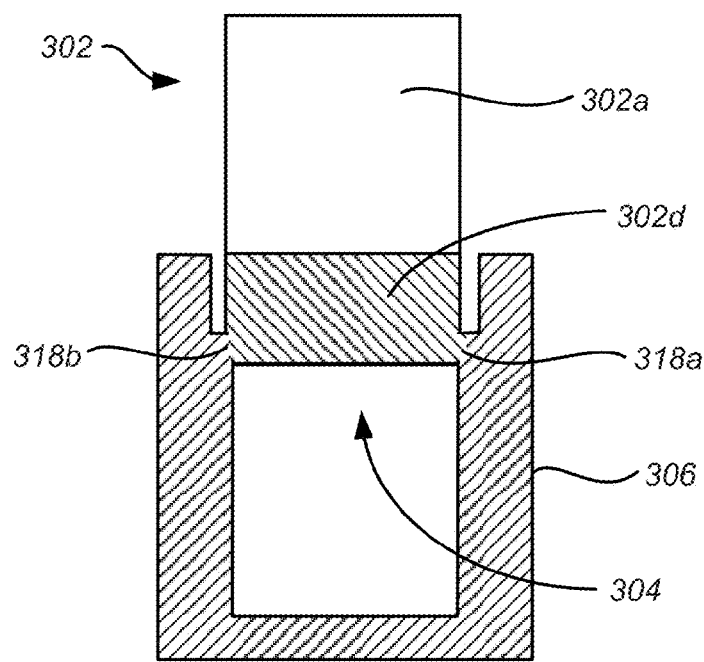

FIG. 3D illustrates a simplified perspective view of the power adapter housing of FIGS. 3A-3C at the conclusion of method 200, but with cover piece 302 removed for illustrative purposes, according to an embodiment of the present invention. FIG. 3D shows solid state welds 318a, 318b as well as an additional weld 318c extending between solid state welds 318a and 318b. Weld 318c may have occurred between another edge (not shown) of second portion 302d and another ledge (not shown) of receiving area 304 during step 215.

The frequency of the ultrasonic acoustic vibration applied during step 215 may vary based on the materials of cover piece 302 and power adapter housing 306. For example, where cover piece 302 and power adapter housing 306 are made from polycarbonate, an appropriate frequency for the ultrasonic acoustic vibration provided during step 215 may be 20,000 hertz (Hz) or another frequency between about 18,000 Hz and about 22,000 Hz. Cover piece 302 and power adapter housing 306 may also be made from other polymers, e.g., acrylonitrile butadiene styrene (ABS), and the provided ultrasonic acoustic vibration may be tuned accordingly.

In addition to the welds mentioned above, other welds may also occur during step 215. For example, the ultrasonic acoustic vibration provided at step 215 may also be experienced at the interface between protrusion 302b and surfaces of receiving area 304, resulting in a solid state weld occurring between protrusion 302b and surfaces of receiving area 304. Although method 200 was described above with reference to a particular device housing, method 200 may be used for a variety of other device housings, including other power adapters and mobile media devices. For example, parts that are typically assembled with a device housing using press-fitting may instead be assembled with device housings using a combination of ultrasonic welding and press-fitting; the travel experienced by a part during ultrasonic welding may press-fit other portions of the part (e.g., protrusion 302b) to the housing.

In other embodiments, an assembling method may include applying a horn to multiple portions of a part to concurrently cause multiple welds to be formed between a part and a housing with which it is being assembled; examples of this are illustrated in the following figures.

Figure 4A:
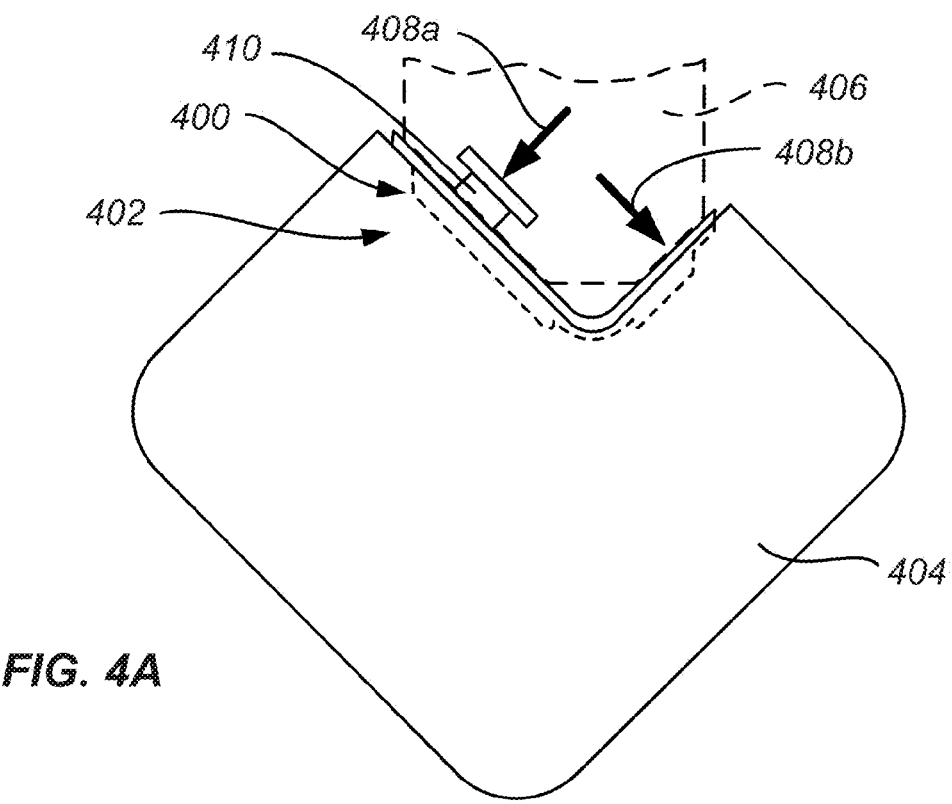
FIGS. 4A and 4B are side views of a cover piece and a power adapter housing at different steps of an ultrasonic welding method, according to an embodiment of the present invention.
Figure 4B:
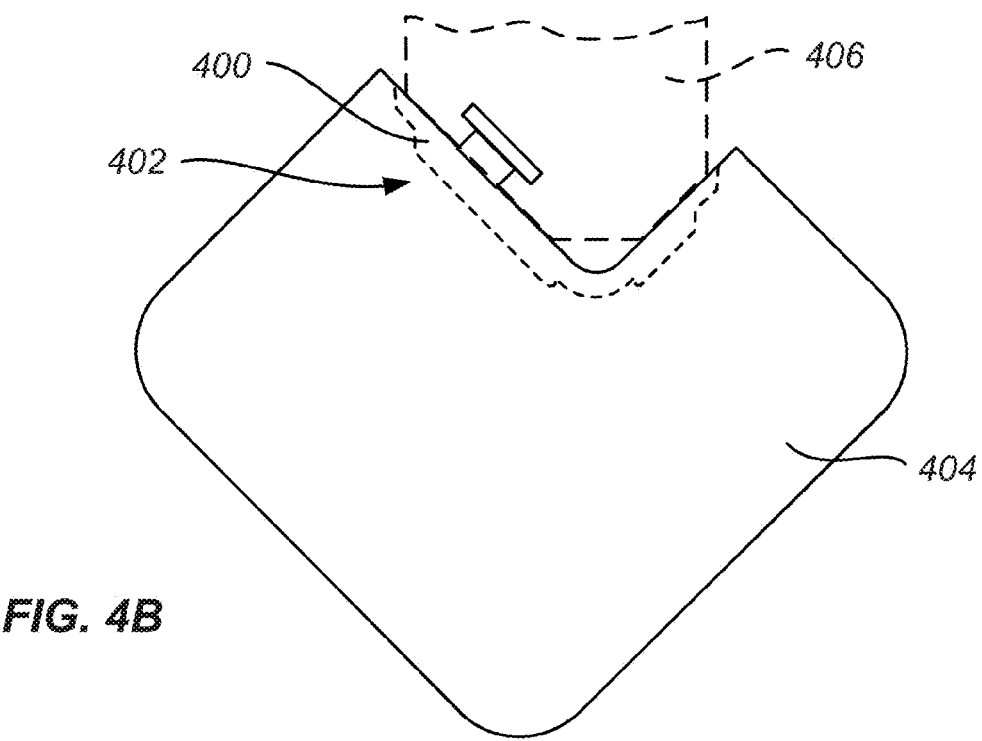

FIGS. 4A and 4B are side views of a cover piece and a power adapter housing at different steps of an ultrasonic welding method, according to an embodiment of the present invention. At a first step, an L-shaped cover piece may be seated or placed partially within a receiving area of a power adapter housing and a horn may be applied to first and second portions of the cover piece.

As shown in FIG. 4A, which may correspond to the first step, a press or other positioning machine may have already placed an L-shaped cover piece 400 (e.g., cover piece 500, as shown in FIG. 5A) partially within a receiving area 402 of a power adapter housing 402. The press may hold cover piece 400 and power adapter housing 406 under pressure such that they remain appropriately positioned throughout an ultrasonic welding process. A horn 406 can be applied in application directions 408a, 408b to multiple surfaces of cover piece 400. Horn 406 may be an ultrasonic welding transducer that is used to apply ultrasonic acoustic vibrations to one or more workpieces, e.g., cover piece 400 and/or power adapter housing 404, during ultrasonic welding operations. As shown in FIG. 4A, horn 406 may be shaped to conform to concurrently interface with multiple surfaces of cover piece 400 and to accommodate a ground plug 410 that may extend from cover piece 400. Following this first step, cover piece 400 may be positioned within receiving area 402 such that surfaces of cover piece 400 and receiving area 402 are adjacent to each other.

Figure 4C:
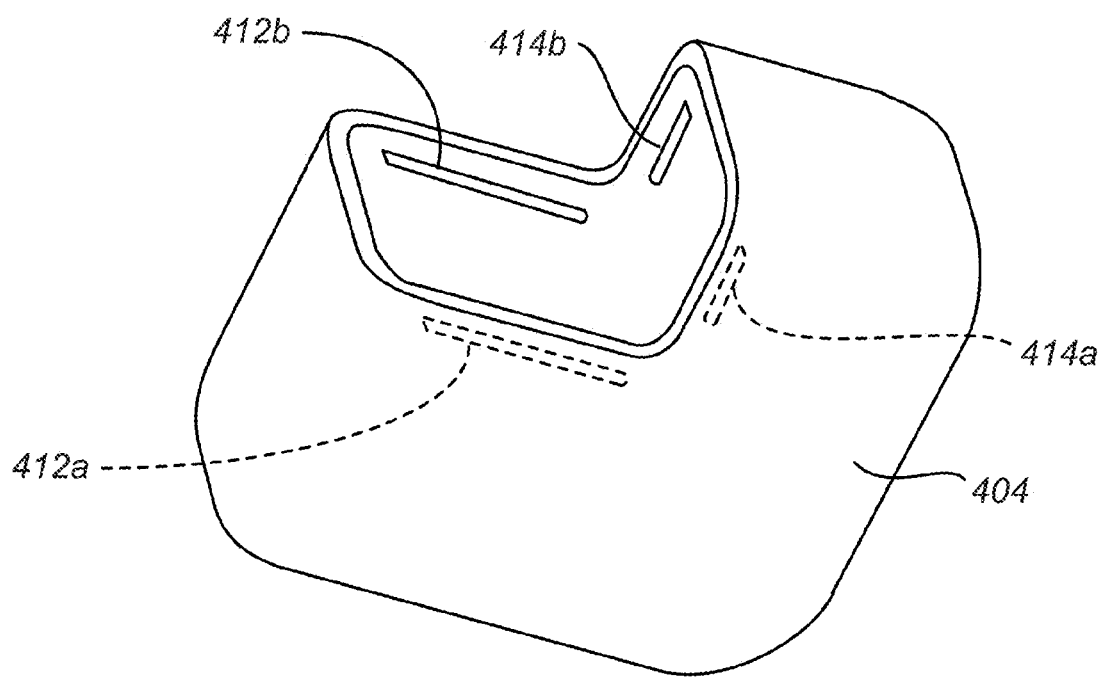
FIG. 4C illustrates a simplified perspective view of solid state welds formed on the power adapter housing of FIGS. 4A and 4B, but with the cover piece removed for illustrative purposes, according to an embodiment of the present invention.

At the next or second step, horn 406 may provide ultrasonic acoustic vibration about application directions 408a, 408b to cover piece 400. As shown in FIG. 4B, which corresponds to the conclusion of the second step, cover piece 400 is further seated within receiving area 402 and surfaces of cover piece 400 have been ultrasonically welded to surfaces of receiving area 402. FIG. 4C illustrates a simplified perspective view of solid state welds formed on the power adapter housing of FIGS. 4A and 4B (housing 404), but with cover piece 400 removed for illustrative purposes, according to an embodiment of the present invention. The solid state welds formed by the second step may include welds 412a, 412b and welds 414a, 414b. Welds 412a, 412b may have been formed by the ultrasonic acoustic vibrations applied in direction 408a, while welds 414a, 414b may have been formed by the ultrasonic acoustic vibrations applied in direction 408b.

The frequency of the ultrasonic acoustic vibration applied during the second step may vary based on the materials of cover piece 400 and power adapter housing 404. For example, where cover piece 400 and power adapter housing 404 are made from polycarbonate, an appropriate frequency for the ultrasonic acoustic vibration provided during the second step may be 20,000 hertz (Hz) or another frequency between about 18,000 Hz and about 22,000 Hz. Cover piece 400 and power adapter housing 404 may also be made from other polymers, e.g., ABS, and the provided ultrasonic acoustic vibration may be tuned accordingly.

Although, the steps of FIGS. 4A-4C were described above with reference to a particular device housing, these steps may be used for a variety of other device housing, including other power adapters and mobile media devices. For example, parts that are typically assembled with a device housing using press-fitting may instead be assembled with device housings using these steps.

In addition to the advantages provided by methods of assembly described above, power adapter housings may also include features to make corresponding methods of assembly even more simple and efficient. Examples of these features for power adapters, which power adapters may be assembled according to the methods described above and/or include embodiments of the transformer described above, are illustrated in the following figures.

III. Ground Lugs for Power Adapters

As mentioned previously, many of the current assembling techniques for power adapter housings and other device housings require a significant amount of manual assembly time. For example, traditional grounding components are often interconnected manually using wiring. Embodiments of the present invention are directed to a ground component for a power adapter that can be interconnected with other grounding components using blind mating, instead of manually added wires.

Figure 5B:
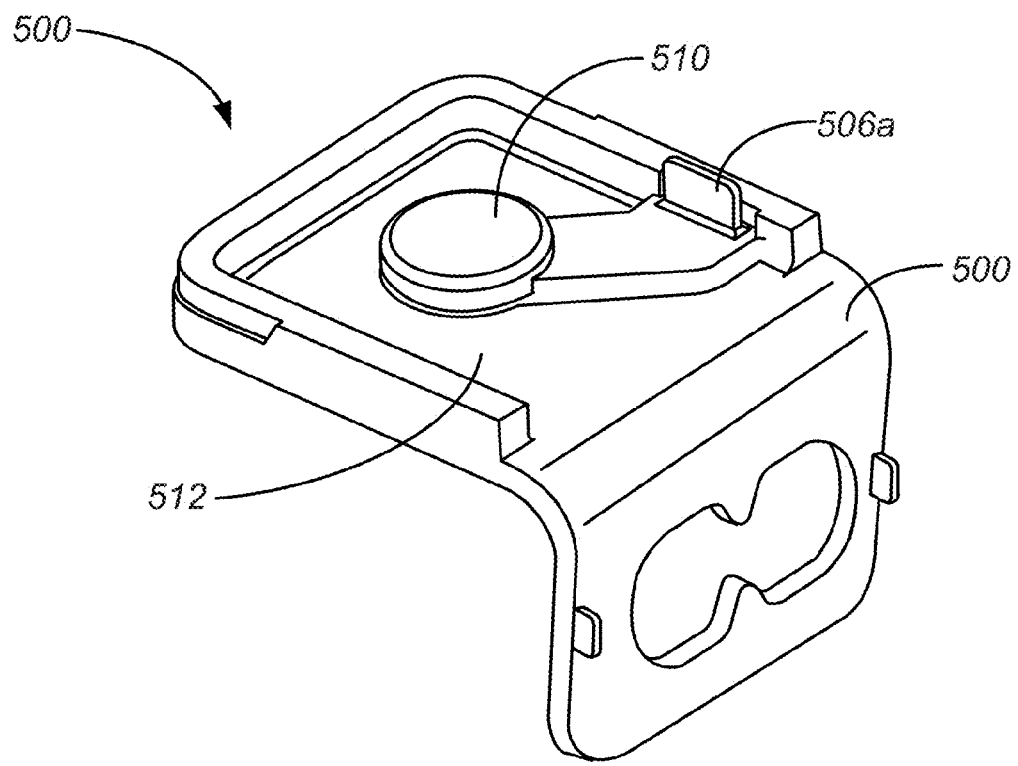

FIGS. 5A and 5B are exploded and simplified perspective views, respectively, of a cover piece for a power adapter housing that includes a grounding lug, according to an embodiment of the present invention. Cover piece 500 may include a ground plug 502 partially inserted into an opening 504 to connect with an inserted molded ground lug 506. Ground plug 502 may be secured to cover piece 500 using a screw 508 that is threadingly coupled to ground plug 502 via a threaded opening (not shown) in ground plug 502. The exposed end of screw 508 may be insulated using a screw end cap 510 that is made from a non-conductive material, e.g., polycarbonate or ABS. As shown in FIG. 5B, a mating end 506a of ground lug 506 may extend from a back surface 512 of cover piece 500. Ground lug 506 may be used to connect electrical components to ground plug 502 for grounding. As such, ground lug 506 may be made from electrically conductive material. For example, ground lug 506 may be made from brass and plated with nickel. Cover piece 500 may be assembled with a power adapter housing, as shown in the following figure.

Figure 5C:
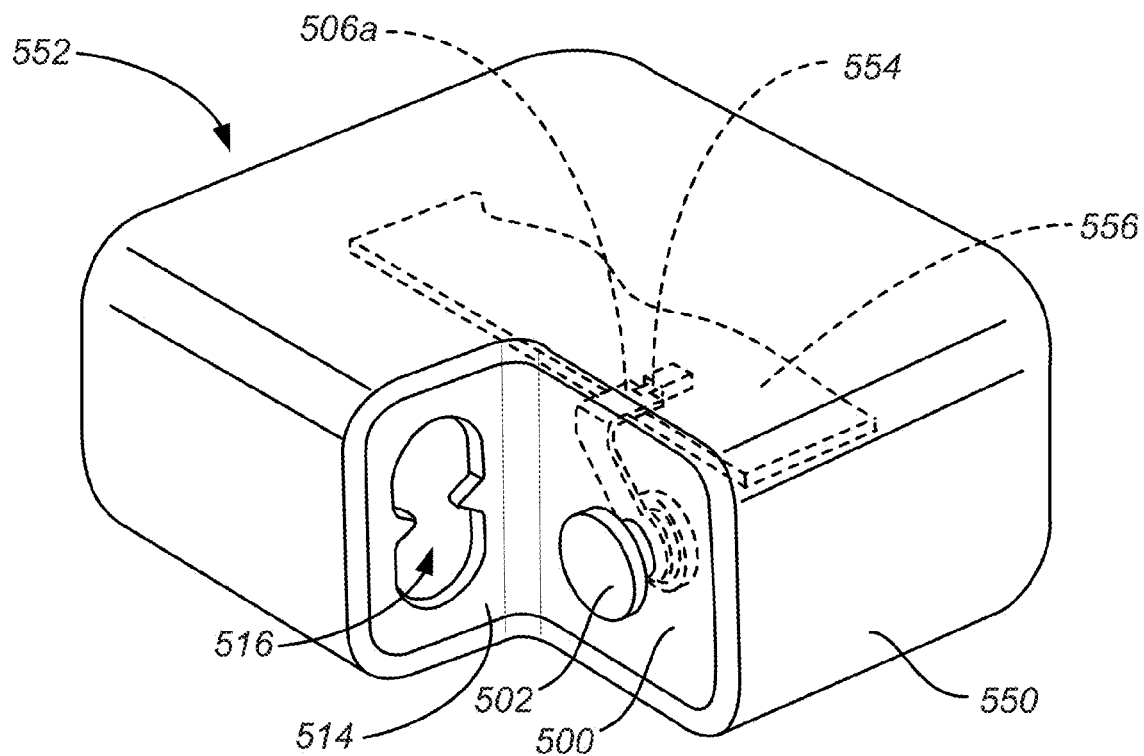
FIG. 5C is a simplified perspective view of the cover piece of FIGS. 5A-5B assembled with a power adapter housing, according to an embodiment of the present invention.

FIG. 5C is a simplified perspective view of the cover piece of FIGS. 5A-5B assembled with a power adapter housing, according to an embodiment of the present invention. Cover piece 500 may be assembled with a power adapter housing 550 to form a power adapter 552. Power adapter 552 may be configured to receive a detachable plug at cover piece 500, which forms a plug region 514, i.e., a region that interfaces with the detachable plug when connected therewith, and a connection opening 516. The detachable plug may include electrical contact surfaces that engage electrical contact pins (not shown) positioned within connection opening 514. Accordingly, when a corresponding detachable plug is received at cover piece 500, prongs of the detachable plug may be electrically coupled to power adapter 552 such that electrical current may pass through the prongs of the detachable plug to the contact pins (not shown) in connection opening 514. In order to securely hold the detachable plug at cover piece 500, the detachable plug may include a notch for slidably engaging ground plug 502, thereby holding the detachable plug in an attached position.

As shown in FIG. 5C, when cover piece 500 is assembled with a power adapter housing 550, a mating end 506a of ground lug 506 may extend such that it contacts a flexible member 554 of a printed circuit board 556 (e.g., printed circuit board 106, as shown in FIG. 1A). Thus, blind mating may occur between ground lug 506 and printed circuit board 556, wherein no manual effort may be required to ensure ground lug 505 contacts flexible member 554 after cover piece 500 is assembled with a power adapter housing 550. This blind mating may allow ground plug 502 to couple to a ground line of printed circuit board 556 via ground lug 506.

Flexible member 554 may be a leaf spring contact, another spring connection or even a pressure connection that provides electrical coupling and positioning tolerance by flexing as necessary to adapt to and to connect with ground lug 506 in its final assembled position. For example, flexible member 554 may be biased to extend farther than necessary from printed circuit board 556 and toward an expected assembled position of ground lug 506. Accordingly, ground lug 506 may still connect with flexible member 554 even if it is slightly out of the expected assembled position, e.g., positioned farther away from flexible member 554 than it would have been in the expected assembled position, and flexible member 554 simply may deflect to adjust to the position of ground lug 506 while maintaining electrical contact therewith.

Although ground lug 506 is shown in FIGS. 5A-5C and described above as having a specific size, shape and location, the size, shape and location of ground lug 506 may be varied, e.g., where the ground plug's position is varied or when the ground lug is implemented with different power adapters or housings of other devices. In addition, ground lug 506 can include a flexible member for connecting with flexible member 554 and flexible member 554 may be replaced with a rigid member. Furthermore, ground lug 506 may not be insert molded with cover piece 500 and may simply rely on screw 508 or other components for connecting to ground plug 502.

In addition to including components that use blind mating to reduce manual assembly time, embodiments of power adapter housings of the present invention may be integrally formed with components that are traditionally assembled with power adapter housings or housings of other electronic devices. Examples of components integrally formed with a power adapter are shown in the following figures.

Figure 6B:
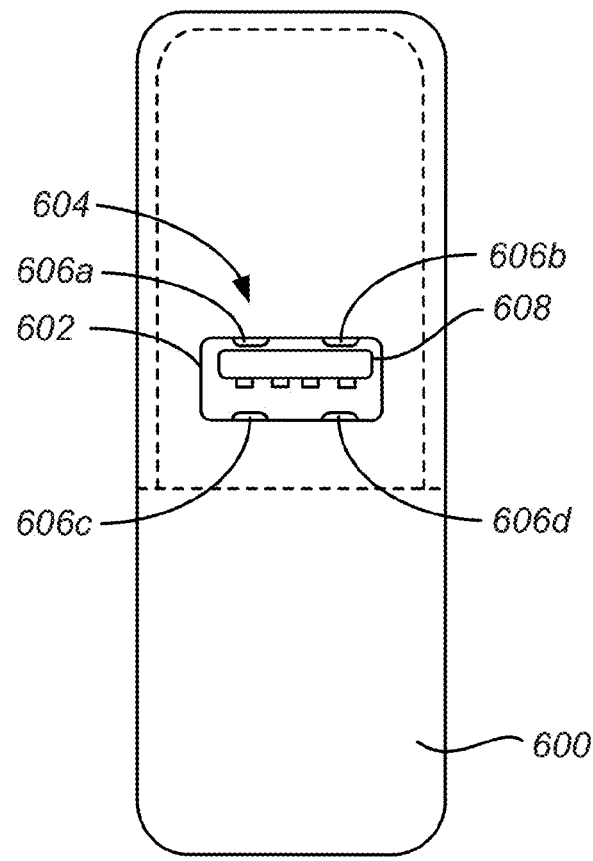

FIGS. 6A and 6B are simplified perspective and front views of a power adapter housing that is integrally formed with a receptacle connector. As shown in FIG. 6A, a power adapter housing 600 (e.g., power adapter housing 550) may include an opening 602 that provides access to a Universal Series Bus (USB) port 604. Housing 602 may be made from polycarbonate or other polymer such as ABS or even metal. Opening 602 may be integrally formed with the housing, and contacts (e.g., contacts 606a-606d, as shown in FIG. 6B) and/or other elements of USB connector 604, some of which are shown in FIG. 6B, may be insert molded with housing 600. As shown in FIG. 6B, USB port 604 includes a plurality of contacts 606a-606d. Some of the contacts are for transmitting data while others are for transmitting power. Concerning the contacts for transmitting power, these contacts may be coupled to a power source through various components (e.g., printed circuit board housed within power adapter housing 600) so as to provide power to a data transmission line when connected thereto.

Although port 604 is described above as being a USB port, port 604 may also be a FireWire (IEEE 1394) port. In addition, the contacts and other components of port 604 may alternatively be provided at port 604 via machining out gaps for them and them assembling them therewith, instead of being integrally formed with gaps and having components insert molded therewith.

The specific details of particular embodiments may be combined in any suitable manner or varied from those shown and described herein without departing from the spirit and scope of embodiments of the invention. Moreover, the invention may also provide features for electronic devices other than power adapters, such as other devices that include transformers, utilize interference fits, or use wires for grounding components.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A power adapter comprising:
   first and second printed circuit boards oriented in first and second planes, respectively, the first plane substantially parallel to the second plane;
   a transformer extending between the first and second printed circuit boards, the transformer comprising:
   a first coiled winding defining a first opening,
   a second coiled winding defining a second opening aligned with the first opening, and
   a core comprising a first portion extending through the first and second openings and a second portion extending between the first and second coiled windings and the first printed circuit board; and
   a body enclosing the first and second printed circuit boards.

2. The power adapter set forth in claim 1 wherein the first and second coiled windings are embedded in the first and second printed circuit boards, thereby forming a board-to-board connection between the first and second printed circuit boards.

3. The power adapter set forth in claim 1 wherein the core is a ferrite core that wraps around both the first and second coiled windings, the ferrite core protruding through and soldered to the first printed circuit board, and wherein a portion of the ferrite core is covered by an insulation element that is soldered to the second printed circuit board.

4. The power adapter set forth in claim 1, wherein the core intersects the longitudinal axes of both the first and second coiled windings.

5. The power adapter set forth in claim 1 wherein the power adapter further includes first and second pin connectors, wherein the first coiled winding and the first printed circuit board are operatively coupled via the first pin connector, and wherein the second coiled winding and the second printed circuit board are operatively coupled via the second pin connector.

6. The power adapter set forth in claim 1 wherein the first and second coiled windings are made from fiberglass and copper.

7. The power adapter set forth in claim 1 further comprising a first connector that couples the first coiled winding to one of the printed circuit boards and a second connector that coupled the second coiled winding to the other of the printed circuit boards.

8. The power adapter set forth in claim 7 wherein each of the first and second connectors are SMT connectors.

9. The power adapter set forth in claim 1 wherein the first coiled winding is adhered to the second coiled winding with an adhesive.

10. The power adapter set forth in claim 1 wherein the body has an L-shape that defines a plug region configured to receive a detachable plug.

11. The power adapter set forth in claim 10 wherein the plug region includes first and second intersecting surfaces and the power adapter further comprises a connection opening positioned along the first surface and a ground plug positioned along the second surface.

12. The power adapter set forth in claim 11 wherein a ground lug is electrically coupled between the ground plug and at least one of the first and second circuit boards.

13. The power adapter set forth in claim 12 wherein the ground lug is connected to the at least one circuit board by a flexible connection member.

14. A power adapter comprising:
   first and second printed circuit boards oriented in first and second planes, respectively, the first plane substantially parallel to the second plane;
   a transformer including: (i) first and second coiled windings extending between the first and second printed circuit boards thereby forming a board-to-board connection between the first and second printed circuit boards, and (ii) a ferrite core comprising:
   a first portion extending through a first opening defined by the first coiled winding and a second opening defined by the second coiled winding, and
   a second portion extending between the first and second coiled windings and the first printed circuit board, wherein the ferrite core is electrically coupled to the first printed circuit board;
   a first pin connector operatively coupled between the first coiled winding and the first printed circuit board;
   a second pin connector operatively coupled between the second coiled winding and the second printed circuit board; and
   a body configured to enclose the first and second printed circuit boards and the transformer.

15. The power adapter set forth in claim 14 wherein the first coiled winding is adhered to the second coiled winding with an adhesive.

16. The power adapter set forth in claim 14 wherein the body has an L-shape that defines a plug region configured to receive a detachable plug.

17. The power adapter set forth in claim 16 wherein the plug region includes first and second intersecting surfaces and the power adapter further comprises a connection opening positioned along the first surface and a ground plug positioned along the second surface.

18. The power adapter set forth in claim 17 wherein a ground lug is electrically coupled between the ground plug and at least one of the first and second circuit boards.

19. The power adapter set forth in claim 18 wherein the ground lug is connected to the at least one circuit board by a flexible connection member.

* * * * *